(12) United States Patent  
Kampfert

(10) Patent No.: US 6,193,432 B1
(45) Date of Patent: Feb. 27, 2001

(54) HOOK AND UNHOOKING COUPLING DEVICE

(76) Inventor: William R. Kampfert, 36443 Upland Ct., Wayne, MI (US) 48184

( * ) Notice: Subject to any disclaimer, the term of this patent is extended or adjusted under 35 U.S.C. 154(b) by 0 days.

(21) Appl. No.: 09/289,480

(22) Filed: Apr. 9, 1999

(51) Int. Cl.[7] .................................................. B25G 3/18
(52) U.S. Cl. ............................ 403/321; 403/19; 403/33; 294/19.1; 294/82.19; 294/82.2; 294/82.27
(58) Field of Search ............................ 294/19.1, 82.19, 294/82.2, 82.27; 403/19, 11, 20, 33, 79, 81

(56) References Cited

U.S. PATENT DOCUMENTS

| | | | |
|---|---|---|---|
| 1,281,336 | * | 10/1918 | Frazier . |
| 2,116,880 | * | 5/1938 | Dee . |
| 3,913,515 | * | 10/1975 | Hernsjo et al. . |
| 4,595,223 | * | 6/1986 | Hawie ................................ 294/19.1 |
| 4,932,700 | * | 6/1990 | Hart ................................ 294/19.1 |
| 5,190,330 | * | 3/1993 | Dunham . |
| 5,463,918 | * | 11/1995 | Lemieux et al. .................... 294/19.1 |

\* cited by examiner

*Primary Examiner*—Lynne H. Browne
*Assistant Examiner*—Tomlyne A Malcolm
(74) *Attorney, Agent, or Firm*—Michael S. Neustel

(57) ABSTRACT

A hook and unhooking coupling device for enabling a user to easily attach or remove a latch hook from a boat or other object. The inventive device includes a pole member, and an engaging member having an opening and a tongue member secured to the distal end of the pole. The engaging member comprises a first member secured to a second member having an open V-shaped cross sectional area. A first edge is secured to the first member and a second edge is secured to the second member while leaving the opening unobstructed. The engaging member is removably positionable about the eyelet member of a latch hook for opening the spring latch while simultaneously retaining the latch hook firmly thereby allowing the user to manipulate the pole member so that the latch hook is positioned about a desired hook. After the latch hook is positioned about the desired hook, the user then manually pulls the engaging member from the latch hook thereby allowing the spring latch to close thereby preventing the latch hook from being accidentally removed. To remove a latch hook from a hook, the user simply reverses this process.

14 Claims, 4 Drawing Sheets

HOOK AND UNHOOKING COUPLING DEVICE

BACKGROUND OF THE INVENTION

1. Field of the Invention

The present invention relates generally to latch hooks and more specifically it relates to a hook and unhooking coupling device for enabling a user to easily attach or remove a latch hook from a boat or other object.

2. Description of the Prior Art

Latch hooks have been in use for years. Typically, a latch hook comprises a hook member, a eyelet member attached to the lower end of the hook member, and a spring latch pivotally attached to the hook member. A rope or cable is typically attached within the eyelet.

The user typically has to manually grasp the hook member while simultaneously retaining the spring latch open to attach or remove the hook member from a hook upon a boat or other structure to be retained. This can be extremely burdensome and cumbersome for the user who must often times physically extend themselves to place the hook member about a hook. In addition, the user must sometimes enter the water to connect the hook member with the hook.

While these devices may be suitable for the particular purpose to which they address, they are not as suitable for enabling a user to easily attach or remove a latch hook from a boat or other object. There currently is no system to easily attach or remove a latch hook from a boat.

In these respects, the hook and unhooking coupling device according to the present invention substantially departs from the conventional concepts and designs of the prior art, and in so doing provides an apparatus primarily developed for the purpose of enabling a user to easily attach or remove a latch hook from a boat or other object.

SUMMARY OF THE INVENTION

In view of the foregoing disadvantages inherent in the known types of latch hooks now present in the prior art, the present invention provides a new hook and unhooking coupling device construction wherein the same can be utilized for enabling a user to easily attach or remove a latch hook from a boat or other object.

The general purpose of the present invention, which will be described subsequently in greater detail, is to provide a new hook and unhooking coupling device that has many of the advantages of the latch hooks mentioned heretofore and many novel features that result in a new hook and unhooking coupling device which is not anticipated, rendered obvious, suggested, or even implied by any of the prior art latch hooks, either alone or in any combination thereof.

To attain this, the present invention generally comprises a pole member, and an engaging member having an opening and a tongue member secured to the distal end of the pole. The engaging member comprises a first member secured to a second member having an open V-shaped cross sectional area. A first edge is secured to the first member and a second edge is secured to the second member while leaving the opening unobstructed. The engaging member is removably positionable about the eyelet member of a latch hook for opening the spring latch while simultaneously retaining the latch hook firmly thereby allowing the user to manipulate the pole member so that the latch hook is positioned about a desired hook. After the latch hook is positioned about the desired hook, the user then manually pulls the engaging member from the latch hook thereby allowing the spring latch to close thereby preventing the latch hook from being accidentally removed. To remove a latch hook from a hook, the user simply reverses this process.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a hook and unhooking coupling device that will overcome the shortcomings of the prior art devices.

Another object is to provide a hook and unhooking coupling device that enables anyone to safely secure a line to a vessel without the assistance of another individual.

An additional object is to provide a hook and unhooking coupling device that allows a user to connect the winch of a boat trailer to a boat without entering the water.

A further object is to provide a hook and unhooking coupling device that fits various shapes and sizes of latch hooks.

Another object is to provide a hook and unhooking coupling device that allows the user to connect a latch hook with a hook many feet away.

A further object is to provide a hook and unhooking coupling device that significantly reduces the amount of time to secure or remove a latch hook from another hook.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
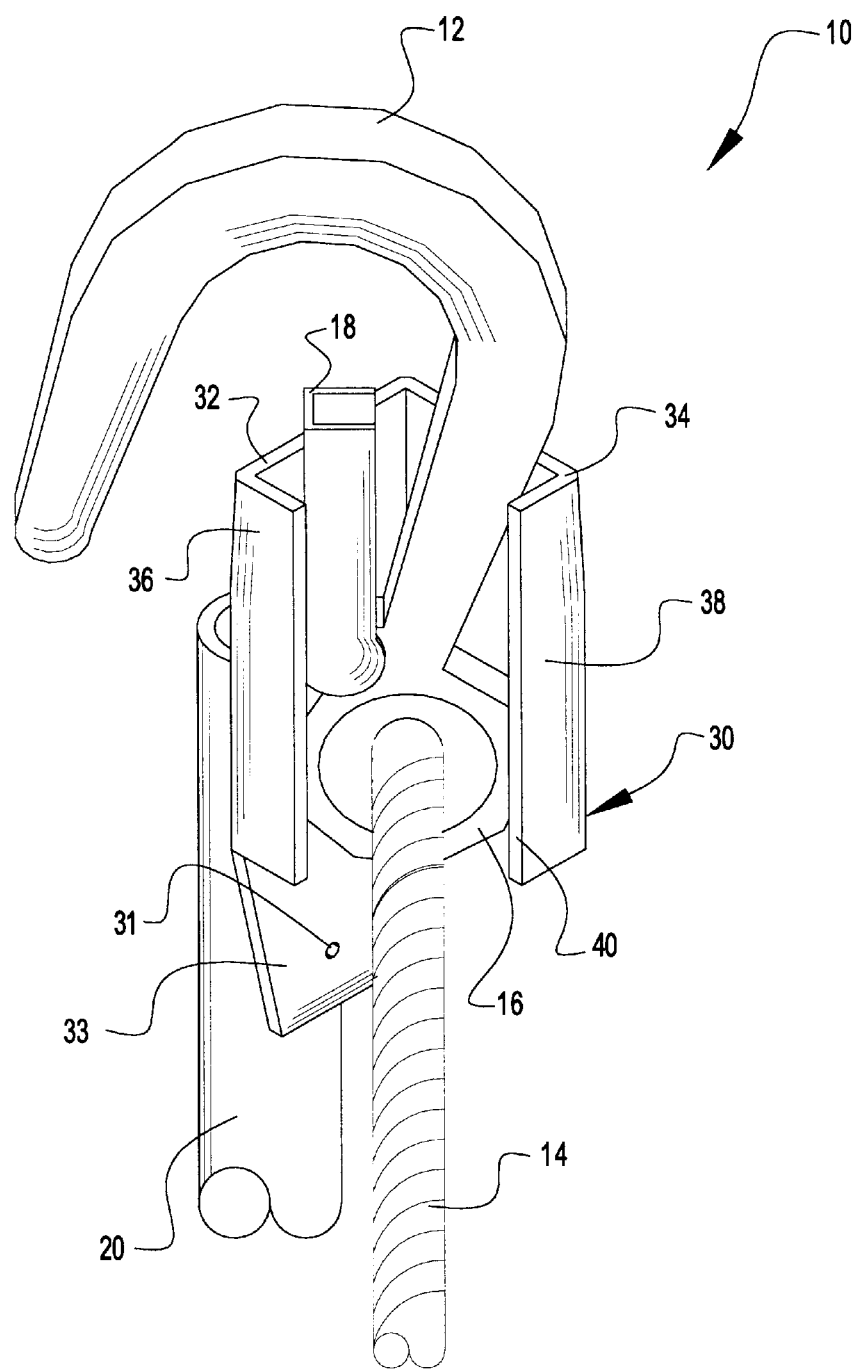
FIG. 1 is an upper perspective view of the present invention with the latch hook positioned within.

Turning now descriptively to the drawings, in which similar reference characters denote similar elements throughout the several view, FIGS. 1 through 4 illustrate a hook and unhooking coupling device 10, which comprises a pole member 20, and an engaging member 30 having an opening and a tongue member 33 secured to the distal end of the pole member 20. The engaging member 30 comprises a first member 32 secured to a second member 34 having an open V-shaped cross sectional area. A first edge 36 is secured to the first member 32 and a second edge 38 is secured to the second member 34 while leaving the opening unobstructed. The engaging member 30 is removably positionable about the eyelet member 16 of a latch hook 12 for opening the spring latch 18 while simultaneously retaining the latch hook 12 firmly thereby allowing the user to manipulate the pole member 20 so that the latch hook 12 is positioned about a desired hook. After the latch hook 12 is positioned about the desired hook, the user then manually pulls the engaging member 30 from the latch hook 12 thereby allowing the spring latch 18 to close thereby preventing the latch hook 12 from being accidentally removed. To remove a latch hook 12 from a hook, the user simply reverses this process.

Figure 2:
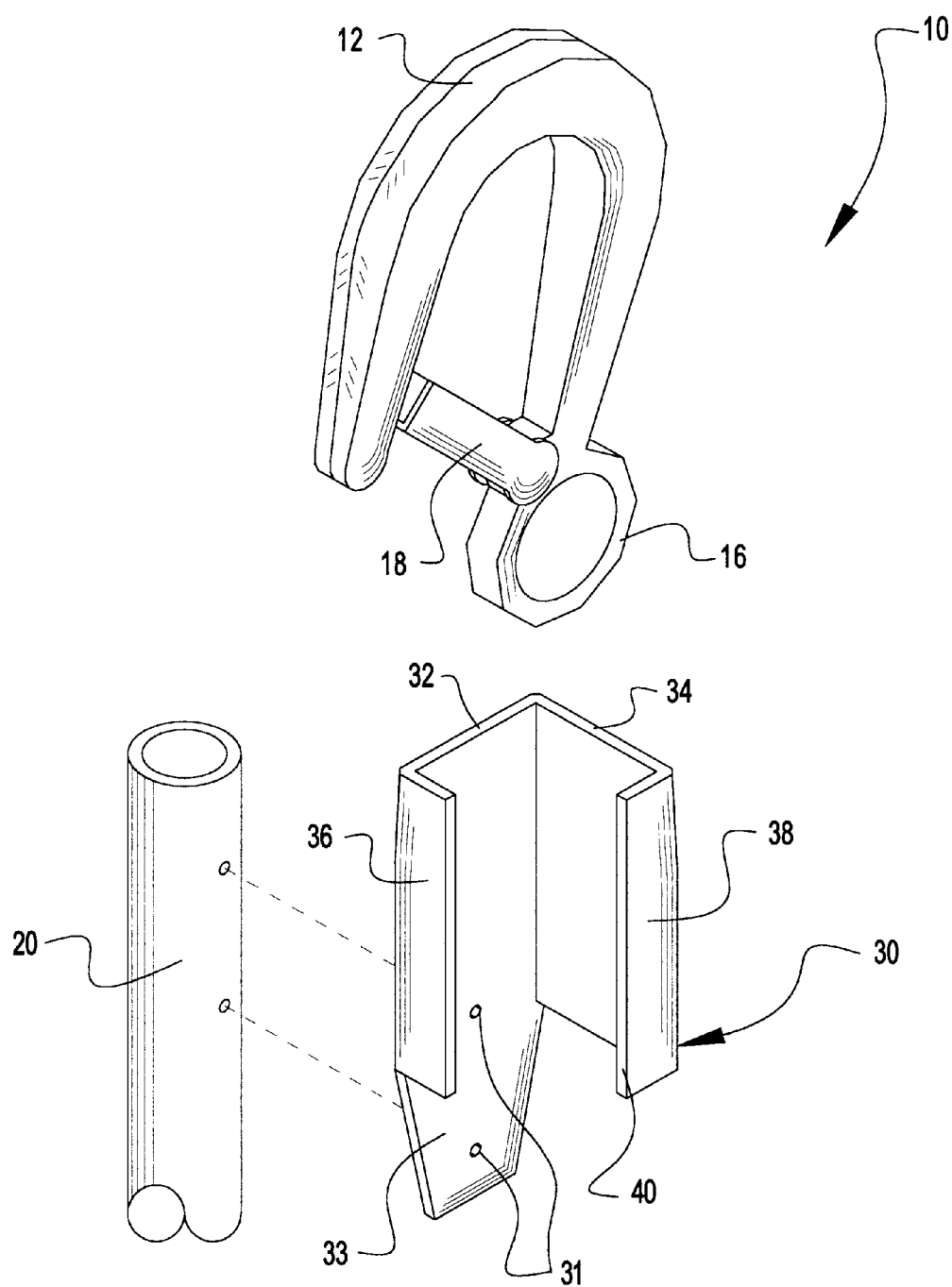
FIG. 2 is an exploded upper perspective view of the present invention.

As shown in FIGS. 1 and 2, the latch hook 12 includes an eyelet member 16 that is attachable to a rope 14 or cable. A spring latch 18 is attached to the latch hook 12 either adjacent to or upon the eyelet as best shown in FIG. 1 of the drawings. The spring latch 18 is normally in a closed position thereby preventing the latch hook 12 from being accidentally removed from a hook upon a boat or other object.

Figure 3:
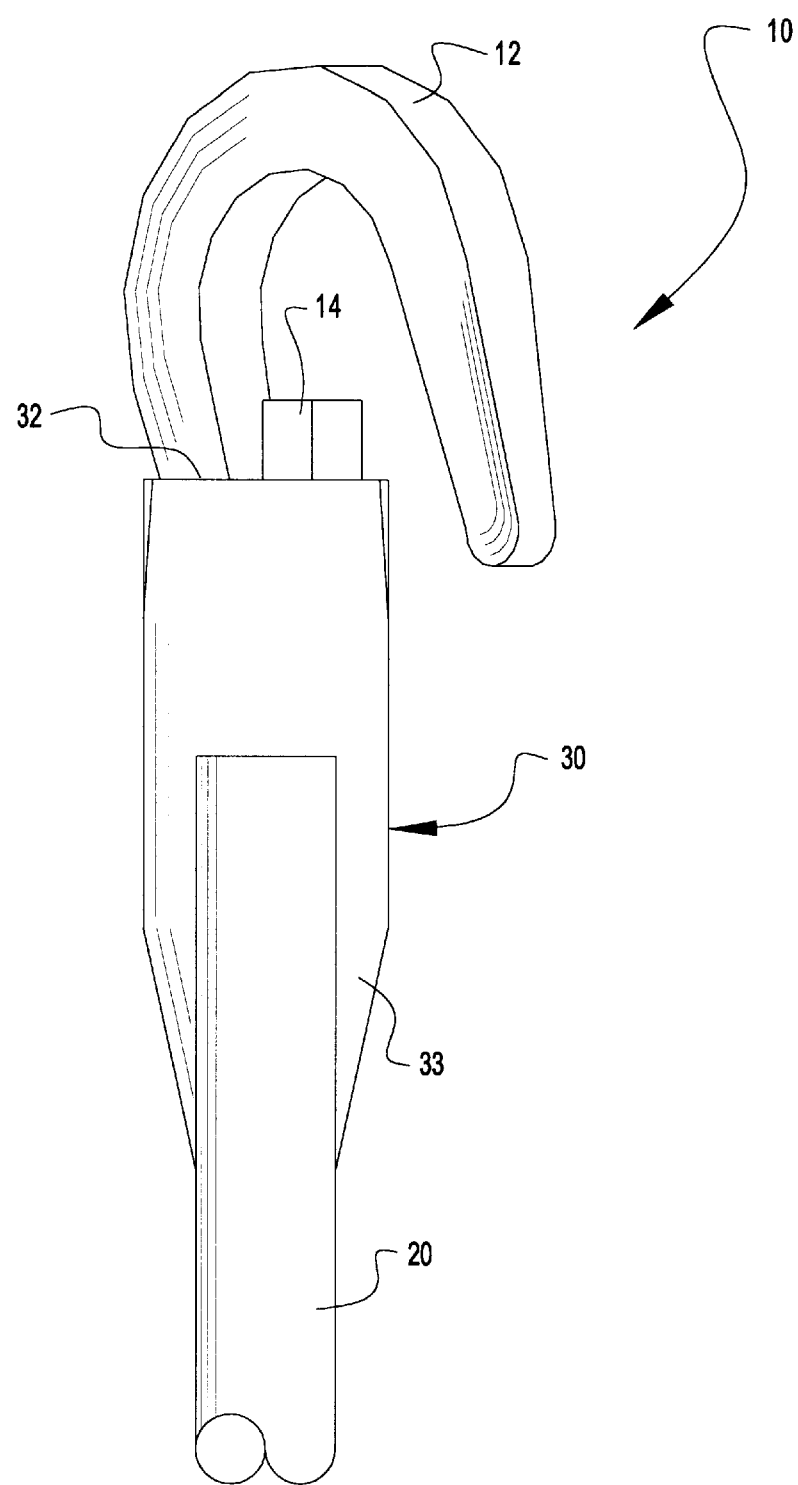
FIG. 3 is a rear side view of the latch hook positioned within the engaging member.

As shown in FIGS. 1 through 3 of the drawings, a pole member 20 is provided having a significant length of between two to thirty feet long. The pole member 20 is comprised of any well-known material, but is preferably constructed of a relatively lightweight material such as tubular aluminum.

An engaging member 30 is provided that is secured to a distal end of the pole member 20 as shown in FIGS. 1 and 2 of the drawings. The engaging member 30 includes a tongue member 33 that is attachable to the pole by at least one conventional fastener 31.

The engaging member 30 further comprises a first member 32 and a second member 34 connected to form a structure having a V-shaped cross-sectional area. A first edge 36 and a second edge 38 are connected to the first member 32 and second member 34 respectively as shown in FIGS. 1 and 2 of the drawings. The space between the first edge 36 and the second edge 38 defines an elongated opening that is larger than the rope 14 or cable attached to the eyelet member 16.

Figure 4:
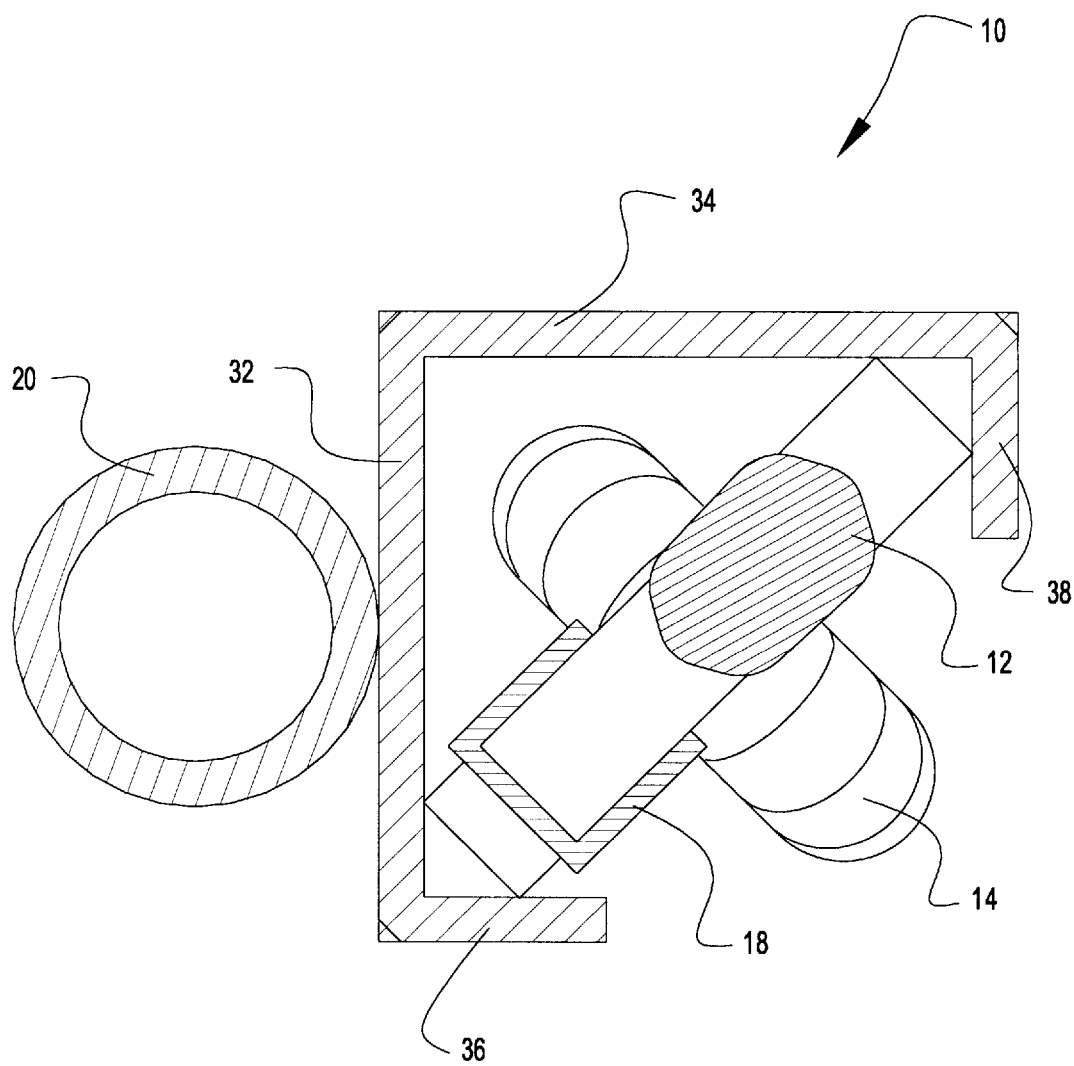
FIG. 4 is a cross sectional view taken along line 4—4 of FIG. 1 of the drawings.

The broadest portion of the engaging member 30 is able to slidably fit about the eyelet member 16 as shown in FIGS. 1 and 4 of the drawings. The first member 32 and the first edge 36 engage the spring latch 18 for retaining it in an open position as shown in FIG. 1 of the drawings.

In use, the user positions the engaging member 30 about the rope 14 or cable through the opening. The user then slides the engaging member 30 over the eyelet member 16 of the latch hook 12 so as to completely open the spring latch 18 of the latch hook 12. When the engaging member 30 is properly positioned, the first member 32 and the first edge 36 will engage the eyelet and the spring latch 18 for retaining the spring latch 18 in an open position as best shown in FIG. 1 of the drawings. Also, the second member 34 and the second edge 38 will engage the opposite side of the eyelet member 16 and also the mid-portion of the latch hook 12 as shown in FIG. 1 thereby preventing the latch hook 12 from moving during attachment.

After the latch hook 12 is properly positioned within the engaging member 30, the user grasps the pole member 20 and manipulates the pole member 20 so that the latch hook 12 is connected to the desired hook upon the boat or other object. Once the latch hook 12 is secured, the user slowly pulls upon the pole member 20 to slide the engaging member 30 away from the latch hook 12 thereby allowing the spring latch 18 to close as shown in FIG. 2 of the drawings. The user continues to slide the engaging member 30 away from the latch hook 12 until the user is able to completely remove it by positioning the rope 14 or cable through the opening.

When the user desires to remove the latch hook 12 from the boat or other object, the above process is simply reversed so that the engaging member 30 simultaneously opens the spring latch 18 while snugly retaining the latch hook 12 thereby allowing the user to easily remove the latch hook 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A hook and unhooking coupling device, comprising:
a pole member having a first end and a second end;
an engaging member attached to said second end of said pole member, wherein said engaging member is formed for engaging a latch hook, wherein said engaging member is formed to engage opposing sides of an eyelet member of a latch hook having an outwardly curved back-side, and a spring latch of said latch hook; wherein said engaging member comprises:
   a first member having an elongated flat structure;
   a second member having an elongated flat structure similar to said first member orthogonally secured to said first member;
   a first edge extending orthogonally from said first member opposite of said second member; and
   a second edge extending orthogonally from said second member opposite of said first member, wherein said first edge and second edge form said opening, wherein spring latch and said eyelet are closely positioned between said first member and said first edge, and wherein a rear curved portion of the latch hook and said eyelet member are closely positioned between said second member and said second edge; and
an elongated opening within said engaging member extending between a distal portion of said first edge and a distal portion of said second edge, wherein said opening has a width larger than a diameter of a rope or cable secured to said latch hook.

2. The hook and unhooking coupling device of claim 1, wherein said engaging member has a substantially rectangular cross sectional area.

3. The hook and unhooking coupling device of claim 1, wherein said engaging member includes a tongue member extending therefrom for attachment to said pole member by at least one fastener.

4. The hook and unhooking coupling device of claim 1, wherein said width of said opening is narrower than a width of said eyelet member.

5. The hook and unhooking coupling device of claim 1, wherein said first edge and said first member engage said spring latch for opening said spring latch.

6. The hook and unhooking coupling device of claim 1, wherein said pole member is comprised of a tubular structure.

7. The hook and unhooking coupling device of claim 1, wherein said second edge and said second member simultaneously engage said eyelet member and said latch hook.

8. A hook and unhooking coupling device, comprising:

a latch hook having a hook member having an outwardly curved back-side, an eyelet member and a spring latch;

a pole member having a first end and a second end;

an engaging member attached to said second end of said pole member, wherein said engaging member is formed for engaging a latch hook, wherein said engaging member is formed to engage opposing sides of said eyelet member of said latch hook, and said spring latch of said latch hook;

wherein said engaging member comprises:

a first member having an elongated flat structure;

a second member having an elongated flat structure similar to said first member orthogonally secured to said first member;

a first edge extending orthogonally from said first member opposite of said second member; and a second edge extending orthogonally from said second member opposite of said first member, wherein said first edge and second edge form said opening, wherein spring latch and said eyelet are closely positioned between said first member and said first edge, and wherein a rear curved portion of the latch hook and said eyelet member are closely positioned between said second member and said second edge; and an elongated opening within said engaging member extending between a distal portion of said first edge and a distal portion of said second edge, wherein said opening has a width larger than a diameter of a rope or cable secured to said latch hook.

9. The hook and unhooking coupling device of claim 8, wherein said engaging member has a substantially rectangular cross sectional area.

10. The hook and unhooking coupling device of claim 8, wherein said engaging member includes a tongue member extending therefrom for attachment to said pole member by at least one fastener.

11. The hook and unhooking coupling device of claim 8, wherein said width of said opening is narrower than a width of said eyelet member.

12. The hook and unhooking coupling device of claim 8, wherein said first edge and said first member engage said spring latch for opening said spring latch.

13. The hook and unhooking coupling device of claim 8, wherein said pole member is comprised of a tubular structure.

14. The hook and unhooking coupling device of claim 8, wherein said second edge and said second member simultaneously engage said eyelet member and said latch hook.

\* \* \* \* \*